(12) United States Patent
Debe et al.

(10) Patent No.: US 6,780,536 B2
(45) Date of Patent: Aug. 24, 2004

(54) FLOW FIELD

(75) Inventors: Mark Kevitt Debe, Stillwater, MN (US); Thomas Herdtle, Inver Grove Heights, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 519 days.

(21) Appl. No.: 09/954,601

(22) Filed: Sep. 17, 2001

(65) Prior Publication Data

US 2003/0059662 A1 Mar. 27, 2003

(51) Int. Cl.[7] ............................................. H01M 2/14
(52) U.S. Cl. ............................ 429/38; 429/39; 429/34
(58) Field of Search ........................... 429/34, 38, 39

(56) References Cited

U.S. PATENT DOCUMENTS

| | | | |
|---|---|---|---|
| 4,292,379 A | 9/1981 | Kothmann | 429/17 |
| 4,324,844 A | 4/1982 | Kothmann | 429/26 |
| 4,631,239 A | 12/1986 | Spurrier et al. | 429/39 |
| 4,686,159 A | 8/1987 | Miyoshi | 429/39 |
| 4,853,301 A | 8/1989 | Granata, Jr. et al. | 429/39 |
| 4,855,193 A | 8/1989 | McElroy | 429/30 |
| 4,988,583 A | 1/1991 | Watkins et al. | 429/30 |
| 5,108,849 A | 4/1992 | Watkins et al. | 429/30 |
| 5,252,410 A | 10/1993 | Wilkinson et al. | 429/33 |
| 5,641,586 A | 6/1997 | Wilson | 429/30 |
| 5,683,828 A | 11/1997 | Spear et al. | 429/13 |
| 5,686,199 A | 11/1997 | Cavalca et al. | 429/30 |
| 5,750,281 A | 5/1998 | Washington et al. | 429/39 |
| 5,773,160 A | 6/1998 | Wilkinson et al. | 429/13 |
| 5,773,161 A | 6/1998 | Farooque et al. | 429/34 |
| 5,776,625 A | 7/1998 | Kaufman et al. | 429/30 |
| 5,798,187 A | 8/1998 | Wilson et al. | 429/26 |
| 5,804,326 A | 9/1998 | Chow et al. | 429/26 |
| 5,840,438 A | 11/1998 | Johnson et al. | 429/30 |
| 5,846,668 A | 12/1998 | Watanabe | 429/32 |
| 5,858,567 A | 1/1999 | Spear, Jr. et al. | 429/12 |
| 5,858,569 A | 1/1999 | Meacher et al. | 429/26 |
| 5,879,826 A | 3/1999 | Lehman et al. | 429/13 |
| 5,885,728 A | 3/1999 | Mercuri et al. | 429/30 |
| 5,906,898 A | 5/1999 | Pondo | 429/34 |
| 5,922,485 A | 7/1999 | Enami | 429/26 |
| 5,942,347 A | 8/1999 | Koncar et al. | 429/30 |
| 5,945,232 A | 8/1999 | Ernst et al. | 429/32 |
| 5,952,118 A | 9/1999 | Ledjeff et al. | 429/32 |
| 5,998,055 A | 12/1999 | Kurita et al. | 429/34 |
| 6,007,933 A | * 12/1999 | Jones | 429/38 |
| 6,037,072 A | 3/2000 | Wilson et al. | 429/33 |
| 6,048,634 A | 4/2000 | Kaufman et al. | 429/34 |
| 6,071,635 A | 6/2000 | Carlstrom, Jr. | 429/34 |
| 6,093,502 A | 7/2000 | Carlstrom, Jr. et al. | 429/25 |
| 6,099,984 A | 8/2000 | Rock | 429/39 |
| 6,174,616 B1 | 1/2001 | Marvin et al. | 429/34 |
| 6,207,310 B1 | 3/2001 | Wilson et al. | 429/26 |
| 6,207,312 B1 | 3/2001 | Wynne et al. | 429/34 |
| 6,309,773 B1 | * 10/2001 | Rock | 429/34 |
| 6,350,540 B1 | * 2/2002 | Sugita et al. | 429/39 |
| 6,406,807 B1 | * 6/2002 | Nelson et al. | 429/13 |
| 6,503,653 B2 | * 1/2003 | Rock | 429/35 |
| 6,541,145 B2 | * 4/2003 | Wilkinson et al. | 429/34 |
| 6,544,681 B2 | * 4/2003 | McLean et al. | 429/39 |
| 6,551,736 B1 | * 4/2003 | Gurau et al. | 429/39 |
| 6,555,261 B1 | * 4/2003 | Lewinski et al. | 429/34 |
| 6,605,381 B1 | * 8/2003 | Rosenmayer | 429/39 |
| 6,607,857 B2 | * 8/2003 | Blunk et al. | 429/34 |
| 6,686,084 B2 | * 2/2004 | Issacci et al. | 429/34 |
| 6,709,781 B2 | * 3/2004 | Suzuki et al. | 429/34 |

FOREIGN PATENT DOCUMENTS

| | | |
|---|---|---|
| EP | 0 529 550 A1 | 8/1992 |
| EP | 1 075 033 A1 | 2/2001 |
| EP | 1 109 241 A2 | 6/2001 |
| JP | 10 284096 A | 10/1998 |
| JP | 2000 003715 A | 1/2000 |
| JP | 77083 | 3/2000 |
| JP | 195530 | 7/2000 |
| JP | 57219 | 2/2001 |
| JP | 76747 | 3/2001 |
| WO | WO 94/11912 | 5/1994 |
| WO | WO 99/56333 | 11/1999 |
| WO | WO 99/67845 | 12/1999 |
| WO | WO 00/02272 | 1/2000 |
| WO | WO 00/26981 | 5/2000 |
| WO | WO 00/57500 | 9/2000 |
| WO | WO 02/56402 A2 | 7/2002 |

\* cited by examiner

*Primary Examiner*—Bruce F. Bell
(74) *Attorney, Agent, or Firm*—Philip Y. Dahl

(57) ABSTRACT

Flow field designs are provided, as well as flow field devices employing the subject flow field designs. A fluid distribution assembly is provided comprising a flow field device and a fluid transport layer disposed between the flow field device and a target area, where, for at least one finite non-zero flow rate and at least one use rate of an active component of the fluid in the fluid transport layer, lateral flux of the active component varies by no more than 35% through at least 90% of all overland portions of said fluid transport layer. In one embodiment, the flow field device comprises a flow field comprising a serpentine channel, comprising non-parallel sequential major segments. In a further embodiment, the angles between successive major segments of the serpentine channel vary progressively.

33 Claims, 9 Drawing Sheets

US 6,780,536 B2

FLOW FIELD

This invention was made with Government support under Cooperative Agreement DE-FC02-99EE50582 awarded by DOE. The Government has certain rights in this invention.

FIELD OF THE INVENTION

This invention relates to flow fields for uniform distribution of fluids or their active components or properties to and from a target area. The flow field may be embodied in a flow field device such as a flow field plate or bipolar plate used for distribution of reactants to, and removal of products from, opposite sides of a catalyzed membrane in an electrochemical cell such as a fuel cell.

BACKGROUND OF THE INVENTION

A number of references depict flow fields having serpentine channels wherein sequential segments of the channels are parallel, including: U.S. Pat. Nos. 4,686,159; 4,988,583; 5,108,849; 5,252,410; 5,683,828; 5,750,281; 5,773,160; 5,846,668; 5,858,567; 5,858,569; 5,945,232; 6,071,635 and 6,099,984.

A number of references depict flow fields having multiple interleaved serpentine channels wherein sequential segments of each channel are parallel, including: U.S. Pat. Nos. 5,683,828; 5,750,281; 5,773,160; 5,804,326; 5,840,438; 5,858,567; 5,998,055; 6,071,635 and 6,093,502.

A number of references depict interdigitated flow fields, including: U.S. Pat. Nos. 5,252,410; 5,641,586 and 6,207,312. In an interdigitated flow field, channels having an inlet but no outlet alternate with channels having an outlet but no inlet.

In addition, the use of a metal screen as a flow field has been taught, e.g. in U.S. Pat. Nos. 4,855,193; 5,798,187; 6,037,072 and 6,207,310.

U.S. Pat. No. 5,922,485 depicts flow fields having serpentine channels composed of concentric circular segments, as well as straight-line serpentine channels.

U.S. Pat. No. 5,686,199 depicts a series-parallel arrangement composed essentially of parallel segments.

U.S. Pat. No. 6,048,634 depicts flow field patterns wherein pairs of adjacent channels carry flow in opposite directions, including spiral patterns and serpentine patterns wherein sequential segments of the channels are parallel.

U.S. Pat. Nos. 4,631,239 and 4,853,301 describe serpentine flow fields wherein sequential segments of the channels are parallel, where the segments are skewed relative to the boundaries of the bipolar plate and/or relative to the flow field on the opposite face of a bipolar plate.

U.S. Pat. No. 4,292,379 describes flow fields on either side of a bipolar plate wherein the depth and/or separation of parallel channels are varied so as to create an uneven distribution that matches the uneven distribution created by the opposing face of the plate.

U.S. Pat. No. 4,324,844 concerns an electrochemical cell that includes cooling fluid flow passages having varying surface area and spacing.

SUMMARY OF THE INVENTION

Briefly, the present invention provides a fluid distribution assembly comprising a flow field device embodying a flow field and a fluid transport layer disposed between the flow field device and a target area, where, for at least one finite non-zero flow rate and at least one use rate of an active component or property of the fluid in the fluid transport layer, lateral flux of the active component or property varies by no more than 35% through at least 90% of all overland portions of said fluid transport layer. In one embodiment, the flow field device comprises a flow field comprising a serpentine channel, comprising non-parallel sequential major segments. In a further embodiment, the angles between successive major segments of the serpentine channel vary progressively.

In another aspect, the present invention provides a flow field device embodying a flow field comprising at least one serpentine channel wherein at least two sequential major segments of the channel are non-parallel.

In another aspect, the present invention provides a flow field device embodying a flow field comprising a channel, where the spacing between analogous parts of sequential major segments of channel decreases monotonically with distance from the inlet, or where land areas separating the major segments decrease in size monotonically with distance from the inlet.

What has not been described in the art, and is provided by the present invention, is a flow field designed to provide uniform lateral flux through the fluid transport layer, and in particular by use of a "zig-zag" serpentine or "progressive" flow channel.

In this application:

"flow field" refers to a pattern of one or more channels embodied in a component of a fluid distribution system, which system allows ingress and egress of fluids to and from a target area;

"target area" refers to an area having significant extent in at least two dimensions which is served by a fluid distribution system, such as the electrochemically active electrode area of an electrochemical device;

"active area" refers to the area of a flow field overlaying and serving the target area;

"active component" refers to a component of a fluid to be used at or in conjunction with the target area, e.g. the oxygen present in air, the hydrogen present in a reformate gas mixture, and the like;

"active property" refers to a property of a fluid to be used at or in conjunction with the target area, e.g. the thermal energy content of a coolant, the solvating capacity of a solvent, and the like;

"serpentine" refers to a pattern, such as the pattern of a channel in a flow field, comprising sequentially connected major segments which alternate in orientation, such as in orientation of flow direction, and which meet at turning points or are connected by turning segments;

"land" or "land area" refer to area between channels or portions of channels of a flow field;

"major segment" refers to a segment of a pattern, such as the pattern of a channel in a flow field, having a geometrical orientation distinct from that of major segments directly preceding or following, which is connected to major segments directly preceding or following either at turning points or through relatively short turning segments;

"flux" refers to the transport of a fluid, such as a gas or liquid, which can be expressed in units of $kg/s/m^2$, or the transport of a component of a fluid, e.g. the oxygen present in air, through a given area, which can be expressed in units of $kg/s/m^2$, or the transport of a property of a fluid, e.g. thermal energy which can be expressed in units of $watts/m^2$, "flow rate" refers to the transport of a fluid, such as a gas or liquid, or the transport of a component of a fluid, e.g. the oxygen present in air, and can be expressed in units of mass per unit time (e.g., kg/s) or volume at standard conditions per unit time (e.g., standard cubic centimeters per minute (sccm) or standard liters per minute (slm));

"fluid transport layer" means a layer allowing fluid transport, typically a layer of porous or otherwise fluid-permeable structural material, but also including a gap maintained mechanically;

"overland portions" of a fluid transport layer used with a flow field are portions of the fluid transport layer that pass over a land area within the active area of the flow field, which excludes portions of the fluid transport layer that are over a flow field channel or portions not passing over the active area of the flow field;

"lateral flux" of fluid through a layer, such as a fluid transport layer, means flux within the layer and generally within the plane of the layer, as distinguished from flux into or out of the layer that may be flux orthogonal to the plane of the layer;

"flow field device" refers to a component of a fluid distribution system which embodies a flow field, typically a component of a fluid distribution system in an electrochemical cell, which is typically either i) a flow field plate or ii) a fluid transport layer that is sufficiently sturdy to hold the pattern of a flow field stamped, molded or cut therein, but which is more typically a flow field plate; which is typically a bipolar plate, which may be made of porous or more typically non-porous material, and which is typically made of electrically conductive material.

It is an advantage of the present invention to provide flow fields and flow field devices capable of highly uniform distribution of fluids or their active components over a target area, which may provide more efficient, stable and durable function in an electrochemical cell.

DETAILED DESCRIPTION

Figure 1:
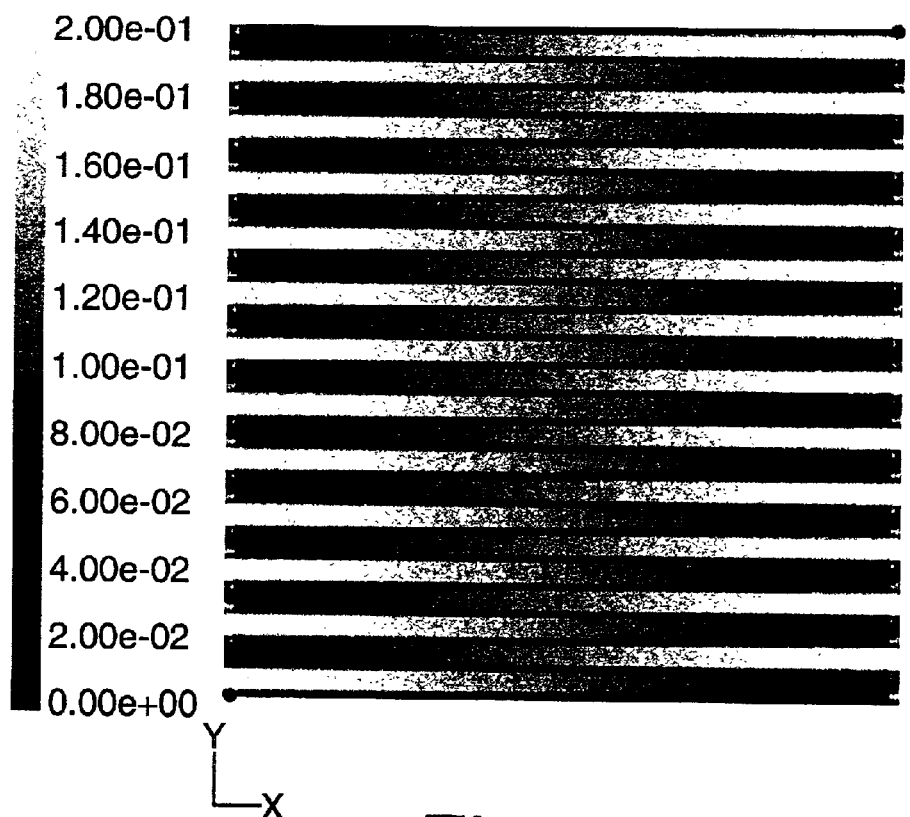
FIG. 1 depicts a computational fluid dynamic (CFD) model of the comparative flow field of Example 1C, having a single serpentine channel composed of parallel sequential channels, with calculated gas velocities in m/sec represented according to the indicated gray scale.

The present invention provides flow fields for uniform distribution of fluids or their active components or properties to and from a target area. The flow field may be embodied in a flow field plate or bipolar plate used for distribution of reactants to, and removal of products from, opposite sides of a catalyzed membrane in an electrochemical cell such as a fuel cell.

The flow fields according to the present invention are typically embodied in a flow field device, which is typically separated from the target area by a fluid transport layer. The flow fields according to the present invention provide more uniform access of the fluid or its active component or property to the target area, by providing highly uniform lateral flux through the fluid transport layer separating the flow field from the target area for the transported fluid.

The flow field according to the present invention may be embodied in a flow field device such as a bipolar plate (BPP) for an electrochemical cell such as a fuel cell. Electrochemical cells include fuel cells, sensors, electrolyzers, and electrochemical reactors. Fuel cells utilize a fuel such as hydrogen and an oxidizing agent such as oxygen to produce an electrical current. The two chemical reactants, i.e., the fuel and the oxidizing agent, separately react at two isolated electrodes containing catalyst. An ion exchange element is located between the electrodes to prevent direct chemical reaction of the two reactants and to conduct ions. In the case of a typical hydrogen fuel cell, the ion exchange element is an ion conducting membrane (ICM). The ICM conducts protons ($H^+$) from the hydrogen electrode to the oxygen electrode. Electrons follow a separate external electrical path, thereby generating an electric current. The combination of an ICM and electrodes is commonly referred to as a "membrane electrode assembly," or MEA. The catalyst electrode material may be coated directly on the ICM to form a catalyst-coated membrane, or may be coated on the fluid transport layer discussed below.

In conventional fuel cells, MEA's are arranged in a stack separated by rigid, electrically-conductive plates which may be known as bipolar plates (BPP). The bipolar plate has one or more fluid-conducting channels engraved, milled, molded or stamped in the surface(s) facing the MEA(s). The fluid-conducting channels on one side of the plate direct fuel to the anode of one MEA while the channels on the other side direct oxidant to the cathode of the next MEA in the stack. The bipolar plates conduct the electrical current generated in each MEA throughout the stack. As used herein, "bipolar plate" should be understood to include the end plates of a stack, which perform the functions of the bipolar plate on one side only and serve the first and last MEA's of the stack. A stack having a single MEA has only two end plates, which are both encompassed by the term "bipolar plate" as used herein.

An additional fluid transport layer is typically situated between the bipolar plate and the active catalytic sites of the MEA. In a fuel cell, this may be referred to as the diffuser/current collector (DCC), gas diffusion layer, or electrode backing layer. (Although the term DCC is used herein, it has become apparent in light of the present invention that gas transport by processes other than diffusion are important to the operation of the DCC.) The DCC is a part of the MEA. Like the bipolar plate, the DCC must conduct fluids and electricity to and from a catalyst surface of the MEA. Unlike the bipolar plate, typical DCC's are porous throughout and do not function as structural members. The DCC typically comprises carbon fiber paper, non-woven roll goods, or cloth such as ELAT™ electrode backing material (E-tek, Inc., Natick, Mass.), typically at a thickness of about 0.4 mm. Another typical material is Toray Carbon Paper (Toray Industries, Inc., Tokyo, Japan), typically at a thickness of about 0.2 mm, which may additionally be coated with a carbon particle dispersion.

Uniform distribution of fuel and oxidants over the catalyst electrodes in a fuel cell should result in more uniform utilization of the catalyst, resulting in better performance, stability and durability. Furthermore, this is expected to result in more uniform distribution of current density (Amps/$cm^2$), and waste heat generation. This should reduce degradation mechanisms that are thermally related, and lead to better durability and longer lifetimes. It is desirable then to find methods to distribute reactant gases most uniformly over the surface of the target area.

Without wishing to be bound by theory, it is believed that the partial pressures of fuel and oxidants at the surface of the catalyst at any given point in an electrode of a fuel cell are directly related to the speed of the lateral flux of the gas in the DCC above. Gasses are transported to the catalyst surface by a combination of diffusion and convection. Closest to the catalyst surface it is to be expected that gasses arrive by diffusion, subject to Fick's Law. The rate of transport in this diffusion-dominated zone is dependent on the gradient in concentration. Farther away from the catalyst surface, gas is transported by a combination of diffusion and convection. Since the gradient in the diffusion zone depends on the rate at which gasses are replenished by convection in the zone above, greater and more uniform lateral flux through the DCC should result in greater and more uniform flux of reactant gasses to the catalyst surface.

Again without wishing to be bound by theory, the importance of convection as well as diffusion can be illustrated by considering the Peclet number for mass transport to the center of a land area. The Peclet number is one way of comparing the relative importance of convective transport to diffusive transport; it is defined as velocity times distance divided by the diffusivity. For a value of 1, convection and diffusion contribute equally. Using values from the Examples considered below, the Peclet number for motion in the Y direction from a channel to the middle of a typical land is: $(0.1 \text{ m/s}) \cdot (0.001 \text{ m})/(1.5\text{e}{-5} \text{ m}^2/\text{s}) = 6.6$; which indicates that convection tends to dominate and that both convection and diffusion are important within the DCC.

In addition, it is believed that greater and more uniform lateral flux in the DCC improves water management in a fuel cell. It is known that water accumulation at the cathode can lead to a reduction in reaction rate by inhibiting oxygen diffusion. This condition is referred to as "flooding." It is believed that the present invention can eliminate local areas of high flooding by eliminating low flux areas, since a uniform lateral flux can uniformly carry away water generated at the cathode.

In contrast to the sort of flow field depicted in U.S. Pat. No. 5,840,438, where the active area of the flow field is densely packed with channels, the flow fields according to the present invention advantageously include significant land areas. Typically 40% or more of the active area of a flow field according to the present invention is land area; more typically 50% or more, more typically 60% or more, and more typically 70% or more.

Figure 18:
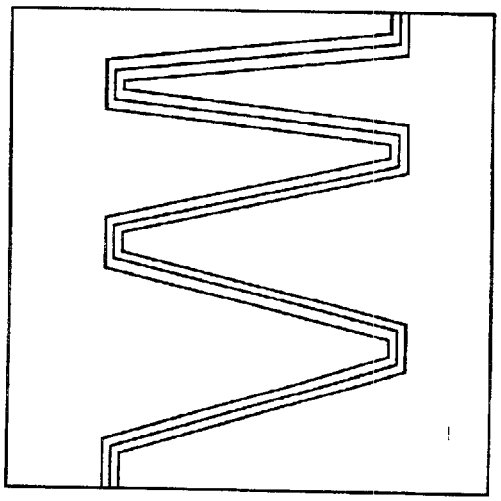
FIG. 18 is a schematic depiction of a "progressive zig-zag" serpentine flow field according to the present invention having multiple courses.

The flow field according to the present invention may comprise any number of channels. The flow field according to the present invention is typically composed of a single channel, but may alternately be composed of a channel composed of multiple courses effectively parallel to each other, such as depicted in FIG. 18. The active area of the flow field may be any suitable size and shape, including rectangular, square, polygonal, circular, elliptical and irregular shapes. Typically the active area corresponds to the target area, which may be any suitable size and shape, including rectangular, square, polygonal, circular, elliptical and irregular shapes. The active area may be subdivided into separate zones serving separate portions of the target area and treating each portion as a single target area, served by a single channel or a channel composed of multiple courses.

The flow field channels may have any suitable cross-section, including rectangular and sloped-side cross-sections. The channels may comprise micro-flow channels or microstructured features as disclosed in U.S. patent application Ser. Nos. 09/557,712 and 09/430,568. The channels terminate at one end in an inlet, which is typically a single opening but may also be multiple openings, and may open into or comprise a manifold. Typically, the channels terminate at another end in an outlet, which is typically a single opening but may also be multiple openings, and may open into or comprise a manifold. Where the entire flow of gas into the flow field is to be consumed or removed through the fluid transport layer, no outlet is necessary.

The fluid distributed by use of the flow field according to the present invention may be any fluid, including gasses, liquids, supercritical fluids, or combinations thereof. The fluid comprises an active component or has an active property, defined above. In a fuel cell, the active component may be the oxygen content of air supplied to the cathode side of the cell or the hydrogen content of a reformate fuel gas supplied to the anode side of the cell. If a pure hydrogen source is used, the active component is the entire fluid. In the case of hydrogen or oxygen, the active component is used up as it is partially or completely consumed in an electrochemical reaction. The use rate is the rate at which the active component is withdrawn from the fluid in the transport layer for consumption in the target area. In another application, the flow fields according to the present invention may be used for uniform distribution of cooling fluids, in a fuel cell or some other device. In that case, the active property is the thermal energy content of the coolant. In a fuel cell, the air and fuel flows may themselves function as cooling fluids. The use rate is the rate at which thermal energy is withdrawn from the active area into the fluid in the transport layer. In another application, the flow fields according to the present invention may be used for uniform distribution of solvents, in which case the active property is the solvating capacity of the fluid and the use rate is the rate at which solutes are dissolved from the active area into the fluid in the transport layer. In another application, the flow fields according to the present invention may be used for uniform distribution of air in a planar air bearing, in which case the active component is the entire gas and the use rate is the rate at which air escapes the bearing.

The flow field according to the present invention is embodied in a flow field device. The flow field device may be made of any suitable material, but should be stable to the fluids transported and the conditions of use. Flow field plates or bipolar plates according to the present invention for use in fuel cells are typically made of an electrically conductive material such as a metal, including titanium and stainless steel or conductive carbon materials such as graphite or carbon composites. Alternately, materials may be used which are plated, vacuum coated or otherwise coated with conductive anti-corrosion layers by wet methods, vacuum methods, or any suitable method. The channel or channels of the flow field are cut, molded, stamped or otherwise formed into the flow field device by any suitable method. The bipolar plates of the present invention may be made by any suitable method, including the methods described in U.S. Pat. No. 5,728,446, to Johnston, et. al., and pending U.S. patent application Ser. Nos. 09/099,269, 09/557,712 and 09/430,568, all of which are incorporated herein in full by reference.

In one embodiment of the present invention, a flow field is cut, molded, stamped or otherwise formed into the material comprising the fluid transport layer. The adjacent "bipolar plate" may then be substantially flat, or may bear additional flow field channels.

The flow field according to the present invention is advantageously used in a fluid distribution assembly comprising: i) a flow field device embodying the flow field according to the present invention and ii) a fluid transport layer disposed between the active area of the flow field and a target area.

The fluid transport layer, defined above, may be the DCC of a fuel cell, discussed above. The fluid transport layer may be made of any suitable porous or permeable material. For use in fuel cells, the material is typically an electrically conductive carbon-based material. The fluid transport layer may be any suitable thickness. For use in fuel cells, the fluid transport layer is typically less than 1 mm, more typically less than 500 microns, and can be less than 300 microns. The fluid transport layer is typically at least 50 microns in thickness. The fluid transport layer may have any suitable in-plane permeability for gasses, but is typically not greater than $1\times10^{-5}$ m$^2$, typically between $1\times10^{-8}$ m$^2$ and $1\times10^{-13}$ m$^2$ and more typically between $1\times10^{-10}$ m$^2$ and $1\times10^{-12}$ m$^2$.

The fluid distribution assembly according to the present invention provides more uniform access of the fluid to the target area, by providing highly uniform lateral flux through the fluid transport layer separating the flow field from the target area. For purposes of the present invention, fluid flux may be determined by analysis of a flow field design using computational fluid dynamic (CFD) calculations. CFD is well established as an investigative tool for analyzing complex systems of fluid flow, and therefore any reliable CFD code may be used. Preferably the CFD code "Fluent" (ver. 5.5, Fluent, Inc., Lebanon, N.H.) is used. This is a general purpose, finite volume code which uses a form of the SIMPLE method for computing the cell pressures and fluid velocities, using the assumptions of steady-state laminar flow with constant viscosity and temperature. Typically, the gas may be considered ideal. Porous media, such as the fluid transport layer, are modeled using Darcy's Law, for which the pressure drop is linearly dependent on the viscosity and flow velocity and inversely dependent on permeability. (G. K. Batchelor, *An Introduction to Fluid Mechanics*, p. 224 (Cambridge University Press, Cambridge, Great Britain, 1967)), (Darcy, H. (1856). *Les Fontaines Publiques de la Ville de Dijon*, p. 590, Victor Dalmont, Paris.)

The fluid distribution assembly according to the present invention typically provides uniformity to the extent that lateral flux of the active component varies by no more than 35% through at least 90% of all overland portions of the fluid transport layer. More typically, lateral flux of the active component varies by no more than 30% through at least 90% of all overland portions of the fluid transport layer, more typically by no more than 25%, and more typically by no more than 20%. It is assumed that there is a non-zero flow rate of a fluid into the inlet of the flow field, since, of course, any flow field will be uniformly still at zero flow. It is assumed that the desired uniformity can be achieved for at least one rate of use of the active component of the fluid, e.g. one rate of oxygen consumption, as described more fully below and in the Examples herein.

Any suitable flow field design which provides uniform flux through the overland portions of the fluid transport layer can be used. Typically, designs having non-parallel sequential channel segments are used. When the rate of use of the active component of the fluid is greater than zero, typically progressive designs are used, where the distance between analogous parts of sequential major segments is progressively closer toward one end of a flow field channel, or where land areas separating the major segments decrease in size progressively with distance from the inlet.

Figure 2:
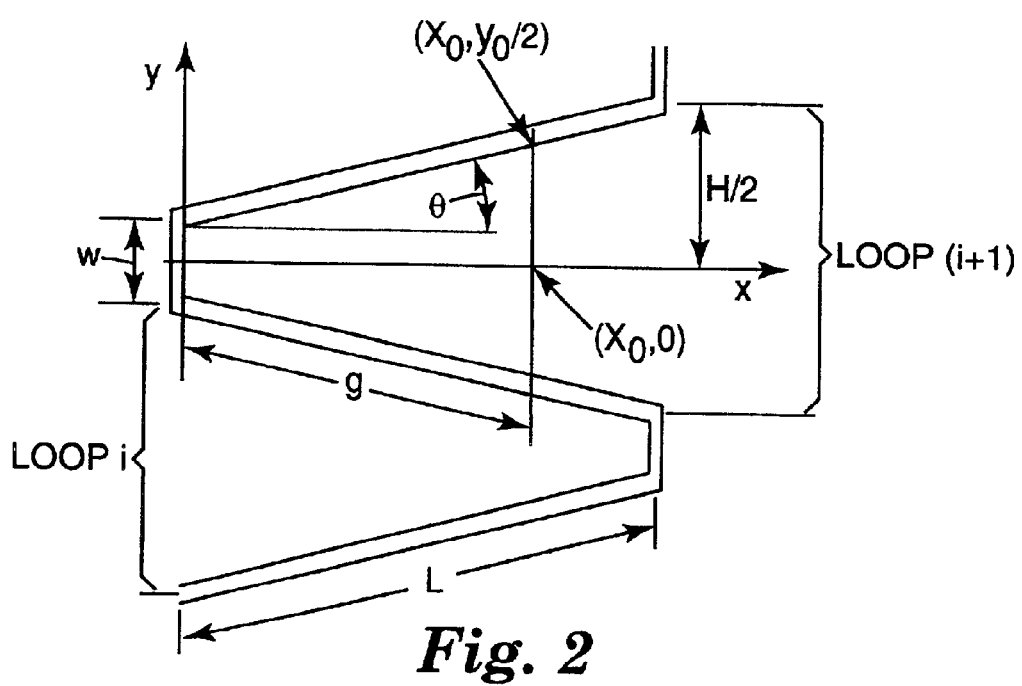
FIG. 2 is a schematic depiction of a "zig-zag" serpentine flow field according to the present invention depicting parameters discussed in the text.
Figure 3:
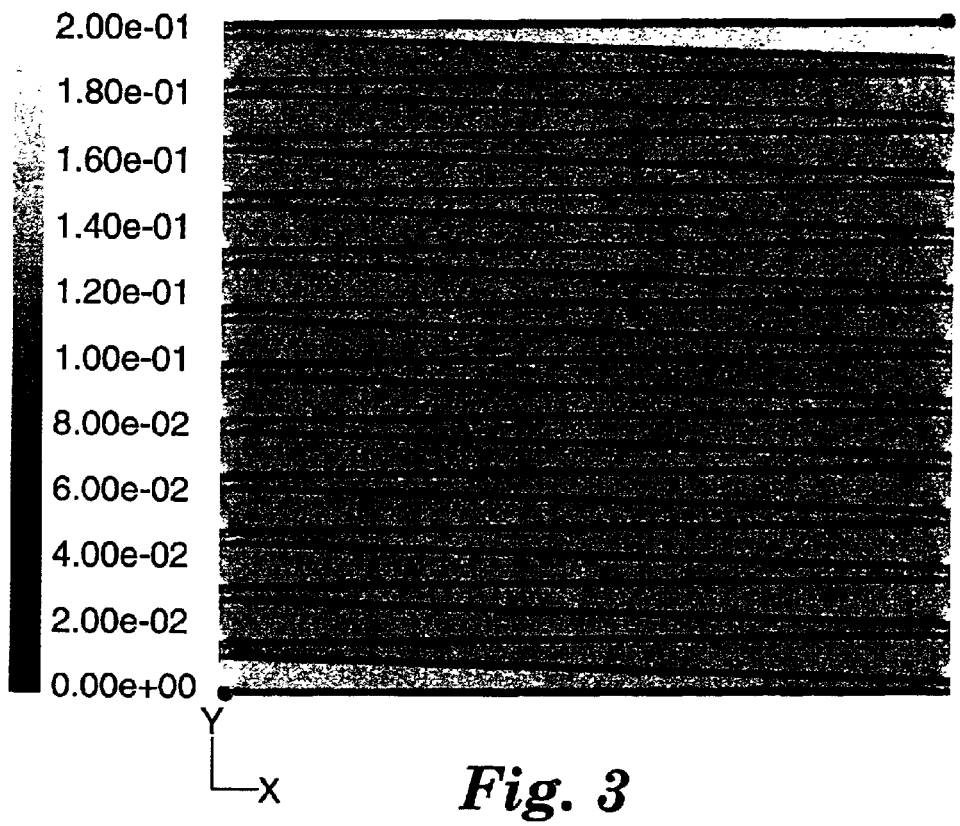
FIG. 3 depicts a CFD model of the "zig-zag" serpentine flow field according to the present invention of Example 2, with calculated gas velocities represented according to the indicated gray scale, which is the same gray scale as FIG. 1.

Designs having non-parallel sequential channel segments may include a "zig-zag" serpentine designs, comprising at least one serpentine channel having non-parallel sequential major segments, such as depicted in FIG. 3 and schematically in FIG. 2. The major segments may be curved, but are typically straight line segments. Turning segments may be made up of curved segments or one or more straight segments. Alternately, the major segments may meet at a point.

Figure 13:
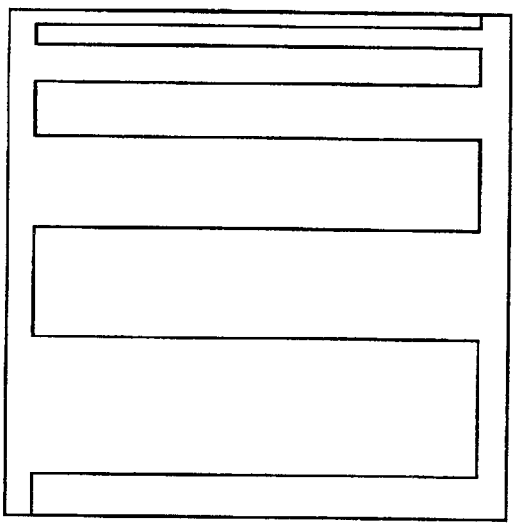
FIG. 13 is a schematic depiction of a progressive serpentine flow field with varying segment spacing according to the present invention.
Figure 14:
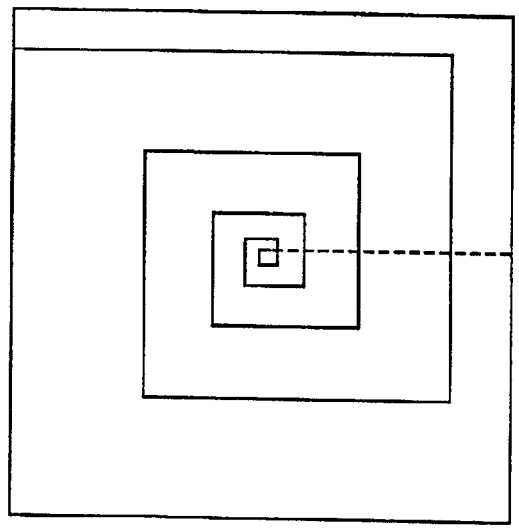
FIG. 14 is a schematic depiction of a progressive spiral flow field according to the present invention.
Figure 15:
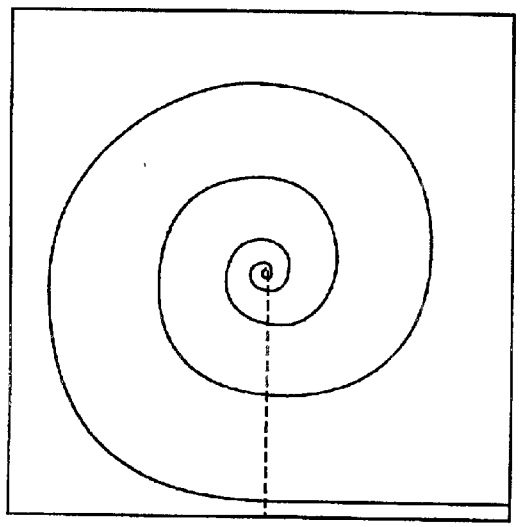
FIG. 15 is a schematic depiction of a progressive spiral flow field according to the present invention.
Figure 16:
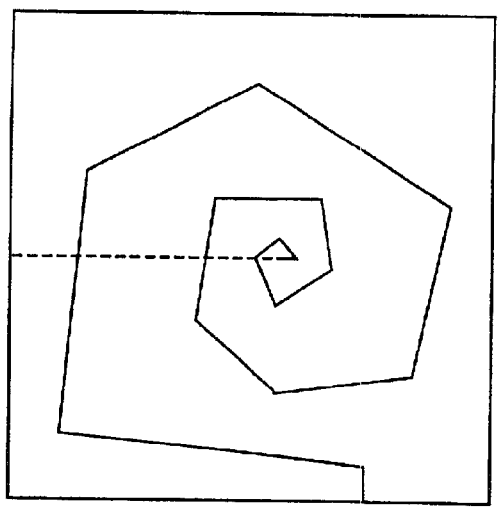
FIG. 16 is a schematic depiction of a progressive spiral flow field according to the present invention.
Figure 17:
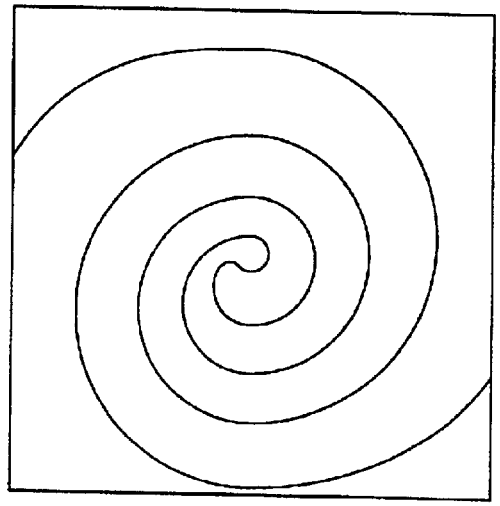
FIG. 17 is a schematic depiction of a progressive spiral flow field according to the present invention.

In a progressive design, the distance between analogous parts of sequential major segments decreases monotonically with distance from the inlet as measured along the channel. Likewise, the size of land areas separating sequential major segments decreases monotonically with distance from the inlet as measured along the channel, specifically, the size measured as geometric area or "areal size". Progressive designs include "progressive zig-zag" designs, comprising a "zig-zag" design where the spacing of adjacent channel segments is progressively closer toward one end of a flow field channel, such as depicted in FIG. 10 and schematically in FIG. 9. A parallel-segment serpentine might also be made progressive, as depicted in FIG. 13. Progressive spiral designs are also contemplated, such as depicted in FIGS. 14–17. The designs in FIGS. 14–16 require an outlet that is not in plane with the flow field.

While CFD models, such as used in the Examples below, can provide a more complete representation of flow fields according to the present invention, design parameters for a given flow field design may also be determined by application of geometry and Darcy's Law, as demonstrated following for the case of a zig-zag flow field according to the present invention. A fuel cell stack may be designed for a preferential operating condition of operating current density and mass flow rates. In this case it is expedient to have the flow field optimized for those operating conditions. For a given flow field design and size, the pressure drop between the inlet and outlet will vary with total mass flow rate. At the preferred operating conditions, the flow rate will be fixed so the overall pressure drop will be fixed for the flow field.

FIG. 2 defines the geometry and parameters of a single zig-zag flow field according to the present invention. The apex half-angle, number and size of loops and the DCC permeabilities can be varied to optimize the tradeoff between pressure drop and uniformity and magnitude of the gas velocities flowing over the lands. The expression developed here gives a first order guideline to selection of those parameters. The expression can then be adapted to allow treatment of the case in which there is gas consumption.

FIG. 2 defines the geometry and parameters of the zig-zag flow field. A single loop has a minimum channel spacing on the end of width, w, and a maximum spacing on the other end of with, H. The length of the channel leg between the loop ends is L. Gas flows primarily in the channel, but also flows over the land, through the DCC, which has in-plane permeability, $K_L$. The coordinate x specifies the point at which we want to derive an expression for the velocity in the y-direction, $U_y(x)$, across the land at point x. From Darcy's law, the velocity is related to the gradient in the gas pressure as, $$U_y(x) = -\frac{K_L}{\mu} \frac{\partial P(x)}{\partial y}, \qquad (1)$$

where $\mu$ is the gas viscosity and $K_L$ the in-plane permeability of the porous DCC material in the X-Y plane.

Since the gas flow in the channel is generally much larger than that flowing through the DCC across the land, the assumption is made that the pressure at any point across the DCC is determined by the flow in the channel, not the DCC. We also assume that the pressure decreases linearly down the channel, so that if there are N identical loops and the total pressure drop is $\Delta P = P_{inlet} - P_{outlet}$, then the pressure drop around any individual loop is $\Delta P/N$.

The gradient of pressure over the land at any value of $x_0$, is thus determined by the pressure drop along the loop channel between coordinates $(x_0, -y_0/2)$ and $(x_0, y_0/2)$, divided by the distance, $y_0$. The pressure drop across the land along y at position $x_0$ is proportional to the total drop around the loop and the fractional distance between coordinates $(x_0, -y_0/2)$ and $(x_0, y_0/2)$, measured along the channel, or $$\frac{\partial P(x_0)}{\partial y} = \frac{\Delta P_y(x_0)}{y_0} = \frac{\Delta P}{y_0 N}\left(\frac{w + 2 \cdot \frac{x_0}{\cos\theta}}{w + 2 \cdot L}\right), \qquad (2)$$

since $\cos\theta = x_0/g$ in FIG. 2 above.
Also from FIG. 2, $y_0 = 2 \cdot x_0 \tan\theta + w$. Replacing $y_0$ in (2) with this gives, from (1), $$U_y(x) = -\frac{K_L}{\mu} \cdot \frac{\Delta P}{N(w+2L)}\left(\frac{w + 2\frac{x_0}{\cos\theta}}{w + 2x_0\tan\theta}\right). \qquad (3)$$

As angle $\theta$ goes to zero, (3) reduces to the equivalent expression for the case of parallel serpentine channels.

Equation (3) can be used to calculate the velocity as a function of position x, for different values of the parameter, $\theta$. To use (3), the pressure is in units of Pascal, viscosity in kg/m·sec, permeability in units of $m^2$, all dimensions in meters, and the velocity in m/sec. For the flow field of Example 2 below, at ~1 L/min flow rates the pressure drop from inlet to outlet is about 5 psig, or 34,500 Pa. For the narrow end of the loop we take w=0.080"=0.002 m. As the apex half-angle, $\theta$, changes, the number of loops that can fit within a defined electrode area, A, changes. Hence, either N can be fixed and the area A (or the rectangular length) of the electrode can be allowed to change, or the number of loops can change with $\theta$ and the area A can be fixed. If the area A is fixed, then referring to FIG. 2, it can be seen that for a side length $A^{1/2}$, the number of complete loops N that fit within that side length is the lowest integer value of $N = A^{1/2}/2(L \sin\theta + w)$. This value for N can be substituted into equation (3) above for this case. However, for simplicity for this example, we consider N to be fixed at N=21 loops and take L=0.071 m, the width of an electrode area which if square would have A=50 $cm^2$. Finally using an in-plane permeability of $K=12\times10^{-12}$ $m^2$, equation (3) becomes:

$$U_y(x) = 6.52 \cdot 10^{-3} \frac{(0.002 + 2 \cdot \frac{x}{\cos\theta})}{(0.002 + 2 \cdot x_0\tan\theta)}, \qquad (4)$$

where $0 \leq x \leq L \cos\theta$.

Figure 6:
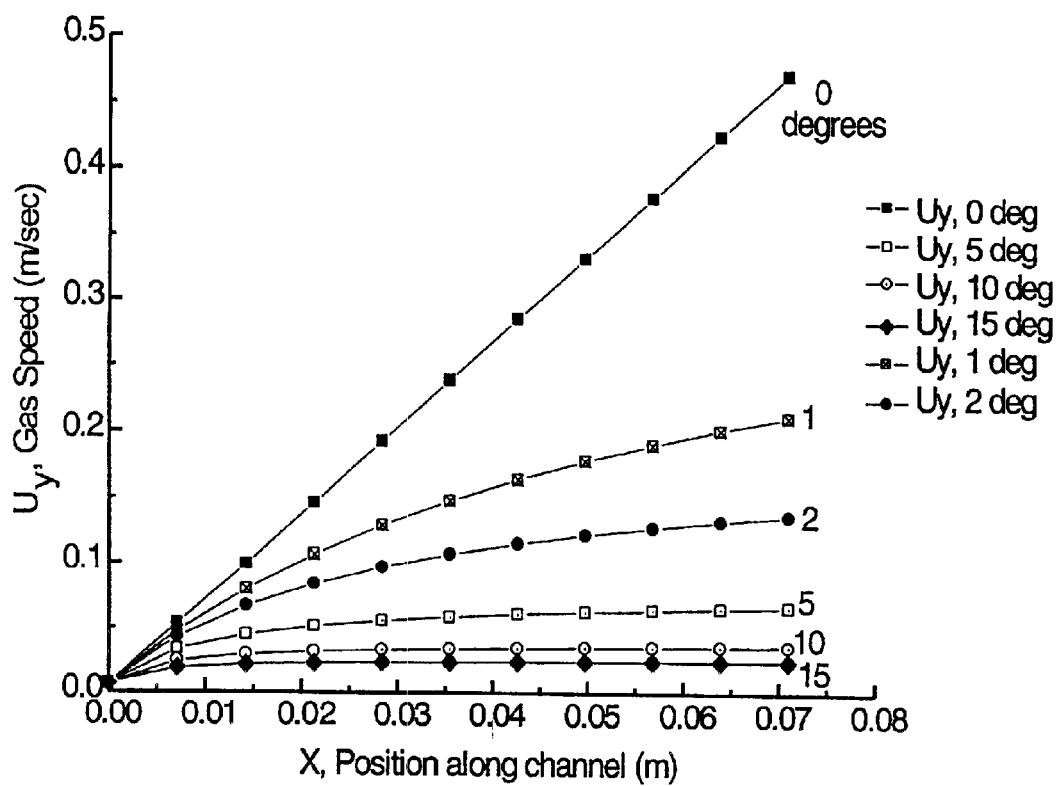
FIG. 6 is a graph of gas velocity crossing a land feature vs. lateral position along the land feature for each of a number of apex half-angles, θ, in accordance with equation 4, below.

FIG. 6 shows a plot of equation (4) for values of $\theta = 0, 1, 2, 5, 10$ and 15 degrees. The non-uniformity of overland flow speed drops extremely rapidly as the angle of the zig-zag increases. Essentially, the variation is gone, except near the apex of the loops, already for $\theta=5$ degrees. This dramatic improvement in gas flow rate uniformity with small angles between the loops, as predicted by equation (3), is fully consistent with the dramatic change in uniformity seen in the CFD calculations shown in example 2 above, where the angle is only ~1.29 degrees (~arc tan[(H/2−w/2)/L]=arc tan[(1.8−0.2)/71]). In fact, the magnitude of the flows, e.g. at $\theta>1$ degree of $U_y < \sim 0.2$ m/sec, for such a simple model are quite close to the value of ~0.13 m/sec seen in the CFD model in Example 2, below, which does not make the simplifying assumption that channel pressure is independent of flow across the land.

The magnitude of the gas speed through the DCC can be controlled by its permeability, K, as shown by equation (3). Gas speed increases with higher DCC permeability. The rate at which the flow speed becomes uniform (within a certain %) with increasing θ depends on the flow field parameters w and L, since they enter into the coefficients and sums of the cosine and tangent terms in (3). The overall geometry of the flow field would also seem to be important. E.g. if it were not square, but had an aspect ratio of 4, meaning it was 4 times longer than it was wide, how the flow channels zig-zagged over the area would be important. If the area was covered by fewer but longer loops running nearly parallel to the long direction, the pressure drop per loop would be larger than if there were more, shorter loops oriented orthogonally.

Figure 8:
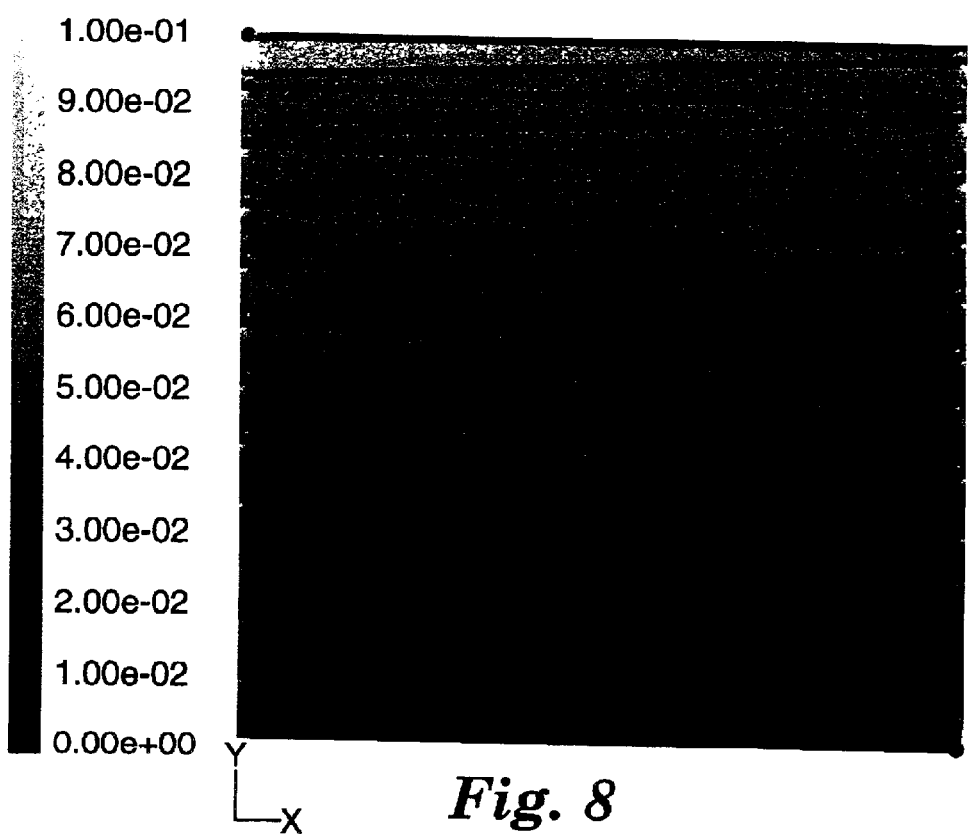
FIG. 8 depicts a CFD model of the "zig-zag" serpentine flow field according to the present invention of Example 6, which is identical to the flow field of Example 2 except for the addition of uniform oxygen consumption, with calculated oxygen flux represented according to the indicated gray scale, which is the same gray scale as FIG. 7.

As FIG. 8 indicates, consumption of the active component, e.g. oxygen, can create additional non-uniformity. A "progressive zig-zag" flow field according to the present invention can be designed to partially compensate for the loss of oxygen partial pressure due to consumption by progressively narrowing the apex angle closer to the flow field outlet.

We now consider the case of having oxygen flux uniform down channel, from one loop to the other. This will help maintain a uniform local current density, J(X,Y) from inlet to outlet since J depends on catalyst potential and the flux of oxygen to the surface of the catalyst. This oxygen flux close to the catalyst surface in-turn depends on the concentration at the surface and the concentration of oxygen in the DCC closer to the flow field, as discussed above.

The approach is to consider the case where the angle θ of the zig-zag decreases from the inlet to the outlet. As seen in FIG. 6, the average flow velocities for a given angle increase as the angle decreases. We consider the case illustrated in FIG. 9, where each loop, i=1 to i=N, has a different value of the channel apex $w_i$, side length $L_i$, and angle $\theta_i$.

From (3) above, for each loop then the uniform velocity is given by:

$$U_{i,y}(x) = -\frac{K_L}{\mu} \cdot \frac{\Delta P}{(w_i + 2L_i)} \left( \frac{w_i + 2\frac{x_0}{\cos\theta_i}}{w_i + 2x_0\tan\theta_i} \right), \text{ where } \Delta P = \sum_{i=1}^{N} \Delta P_i. \quad (5)$$

Since the objective is to determine the conditions for uniform $O_2$ mass flow from loop to loop, we can compare the flow at the same point on each loop, e.g. the value when $x=L_i\cdot\cos(\theta_i)$ at the widest part of each loop. It is most useful to use an approximation to (5) for the following. Since $\theta_i$ is small $\cos(\theta_i)\sim 1$ and $L_i\cdot\cos(\theta_i)\cong L_i$ for all loops. Also, at $x=L_i$, $(w_i+L_i)\cong L_i$. So (5) reduces to:

$$U_{i,y}(L_i) \sim -\frac{K_L}{\mu} \cdot \frac{\Delta P_i}{2L} \frac{1}{\sin\theta_i}, \quad (6)$$

which is true when $2 L_i \sin \theta_i \gg w_i$, as is the case for reasonable values of these three parameters. This shows that for down-stream loop to loop uniformity, varying $\theta_i$ will be the most effective variable to change.

We have asserted above that as a first step in keeping the oxygen partial pressure over the catalyst surface uniform down channel, keeping the mass flow rate uniform through the DCC above the catalyst is useful. The differential mass flow rate of oxygen per unit area over the land at the position $x \cong L_i$ is the flux of oxygen entering at that position and is simply the product of the velocity and density of oxygen, $\rho_i(O_2) = P_{i,O_2} \cdot M_w / RT$ at that point of loop i:

$$\frac{dm_{i,O_2}}{dA}(x = L) = \frac{-K_L M_w}{RT\mu} \frac{p_{i,O_2} \Delta P_i}{2L_i \sin\theta_i}, \quad (7)$$

where $M_w$ is the molecular weight of oxygen, R the gas constant, and dA=hdL is the element of area through which the gas is flowing in the DCC of thickness h.

Expressions for $\Delta P_i$ and $P_{i,O_2}$ can be obtained as follows. We assumed above equation (2) that the total pressure varied linearly along the flow channel, so the pressure drop is simply proportional to the path length. We assume this is true for the total pressure when current is generated also. The path length around the $i^{th}$ loop is $2L_i+w_i\sim 2 L_i$. If the total flow field channel length is C, then $$\Delta P_i = \Delta P \frac{(2L_i + w_i)}{C} \cong \Delta P \frac{2L_i}{C}. \quad (8)$$

For $P_{i,O_2}$, we note that the oxygen partial pressure decreases as the loop index increases due to consumption. We have to assume some relationship between the two, so for simplicity will assume a linear relationship so that if $P_{in}(O_2)$ is the inlet oxygen partial pressure, the oxygen is removed in direct proportion to the distance down the channel, or in direct proportion to the loop index, i. If η is the stoichiometric flow ratio, then 1/η is the oxygen utilization factor and so $$p_{i,O_2} = P_{in}(O_2)\left(1 - \frac{i}{N\eta}\right). \quad (9)$$

Using (8) and (9) in (7) gives finally, $$\frac{dm_{i,O_2}}{dA}(x = L) = \frac{-K_L M_w}{RT\mu} \frac{P_{in}(O_2)\Delta P}{C\sin\theta_i}\left(1 - \frac{i}{N\eta}\right). \quad (10)$$

Uniform oxygen mass flux in all the loops, e.g. particularly the first and last (i=1 and N), can be obtained by requiring the right side of (10) to be the same for both values of i, or:

$$\frac{\sin\theta_1}{\sin\theta_N} = \frac{(1 - 1/N\eta)}{(1 - 1/\eta)} \approx \frac{\eta}{(\eta - 1)}, \text{ since } N \gg 1. \quad (11)$$

So in order to have a uniform mass flow of oxygen through the DCC of each loop, to a first approximation the angle of the zig-zag channel should decrease as the loop index increases towards the gas exit. For the general loop index (i), in terms of the initial loop angle $\theta_1$, $$\sin\theta_i = \sin\theta_1 \frac{(N\eta - i)}{(N\eta - 1)}. \quad (12)$$

Since η=2 is a typical desired value for the air stoichiometry of a fuel cell, if the loop angle was 5 degrees for the first loop, as FIG. 6 would indicate gives good uniformity, then the last loop should have a loop angle smaller by sin $\theta_N$=½ sin 5°=0.0436, implying $\theta_N$=2.5°. Going to a smaller angle would tend to decrease the uniformity within the last loop compared to the first loop, as indicated by FIG. 6, so some compromise between intra-loop and inter-loop uniformity is probably necessary, but this example shows that such a trading off is possible to potentially obtain a more uniform overall current density than can be obtained with simple serpentine flow fields that have parallel and uniformly spaced channels.

This invention is useful in constructing electrochemical cells such as fuel cells.

Objects and advantages of this invention are further illustrated by the following examples, but the particular materials and amounts thereof recited in these examples, as well as other conditions and details, should not be construed to unduly limit this invention.

EXAMPLES

In all of the following examples, flow field designs were analyzed using "Fluent" (ver. 5.5, Fluent, Inc., Lebanon, N.H.) for computational fluid dynamic (CFD) calculations. This is a general purpose, finite volume code which uses a form of the SIMPLE method for computing the cell pressures and velocities.

The gas densities and viscosities used modeled those encountered on the air (cathode) side of a fuel cell, where an air flow provides oxygen to the cell. Similar models for the anode side could be constructed using gas densities and viscosities for a hydrogen fuel flow. The assumptions used in these models were steady-state laminar flow with constant viscosity ($2.1 \times 10^{-5}$ kg/m·s) and temperature (75° C.); no reactions or gas consumption were included except oxygen consumption as noted. Models that include oxygen consumption assume a constant and uniform oxygen consumption rate over the target area. The gas was considered ideal, implying that the density changes directly with the pressure. The porous medium of the fluid transport layer was modeled using Darcy's Law, for which the pressure drop has first order dependence on the viscosity, permeability, and flow velocity. In each case, air flow into the flow field inlet was 800 sccm and exit pressure was 253,000 Pascals (2.5 atmospheres).

Example 1C

Parallel-segment Serpentine Flow Field, Zero Consumption (Comparative)

A CFD model was built for a comparative flow field, having a single serpentine channel composed of parallel adjacent segments, for a 50 cm² active area fuel cell, consisting of 25 parallel segments (making 24 loops) each 0.8 mm wide and 1.0 mm deep and spaced 2.0 mm apart (the land width). A CFD model was built in which this flow field was in intimate contact with a DCC having a thickness of 122 microns (4.8 mils) and an in-plane permeability of $K=12 \times 10^{-12}$ m². This value of K was chosen to represent a typical value for a DCC in an operating fuel cell. The CFD model calculations were done for the case of 800 sccm air flow, and no oxygen consumption.

FIG. 1 depicts the comparative flow field and shows, in the indicated gray scale, calculated gas velocities flowing over the lands in the Y direction within the DCC. Velocities are distributed along a spectrum from the lightest areas, representing velocities greater than 0.2 m/sec, to the dark areas, representing velocities less than ¼$^{th}$ that of the lightest area. From one side of each loop of the flow field channel to the other, there is considerable nonuniformity in the gas velocity over the land area.

Examples 2–4

"Zig-zag" Channel Serpentine Flow Fields, Zero Consumption

In Examples 2–4, CFD models were built for flow fields according to the present invention where adjacent channel segments of a serpentine flow field were slightly angled with respect to one another, so that any given loop of a channel has an apex half-angle, θ, as defined in FIG. 2. To remain suitably comparable to Example 1, the flow field of Example 2 also consisted of 25 channel segments each 0.8 mm wide×1.0 mm deep. The active area is 50 cm² and the overall channel length was approximately the same as in Example 1. Since the 25 channels are 71 mm long and 0.8 mm wide, they cover 14.2 cm², which is 28.4% of the 50 cm² active area, leaving 71.6% land area. The same DCC was used, having a thickness of 122 microns (4.8 mils) and an in-plane permeability of $K=12 \times 10^{-12}$ m². The total air mass flow rate was 800 sccm.

For Example 2, the apex half-angle was approximately 1.29 degrees and the land widths varied from 0.4 mm to 3.6 mm. FIG. 3 depicts the flow field and shows calculated gas velocities flowing in the Y direction over the lands within the DCC in the same gray scale as FIG. 1. For approximately 90% of the overland active area, the velocities are approximately 0.13 m/sec. Some higher velocities are seen near the inlet and outlet holes. This represents a large improvement in uniformity over Example 1C.

Figure 4:
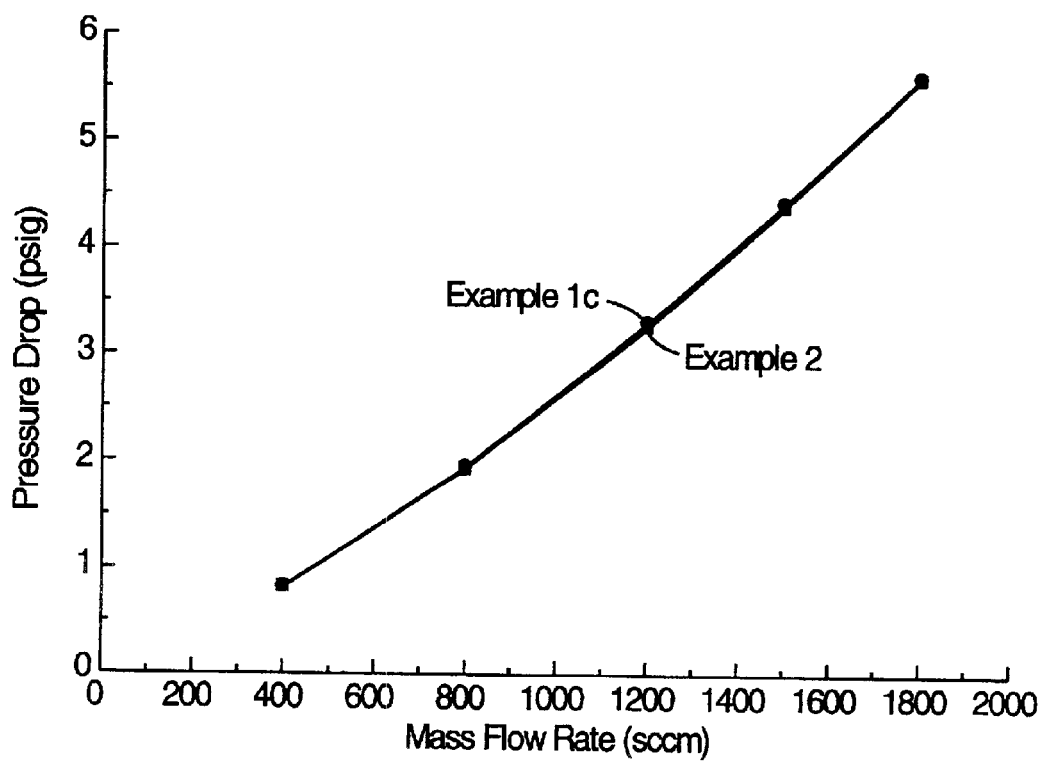
FIG. 4 is a graph of inlet-to-outlet pressure drop vs. mass flow rate for the flow fields of Example 2 and comparative Example 1.

FIG. 4 is a graph of inlet-to-outlet pressure drop as a function of mass flow rate for the Example 2 and comparative Example 1 flow fields. It is seen that they have the same pressure drop, and therefore pressure drop was not disrupted by the change from a parallel-segment serpentine to a zig-zag serpentine design.

Figure 5:
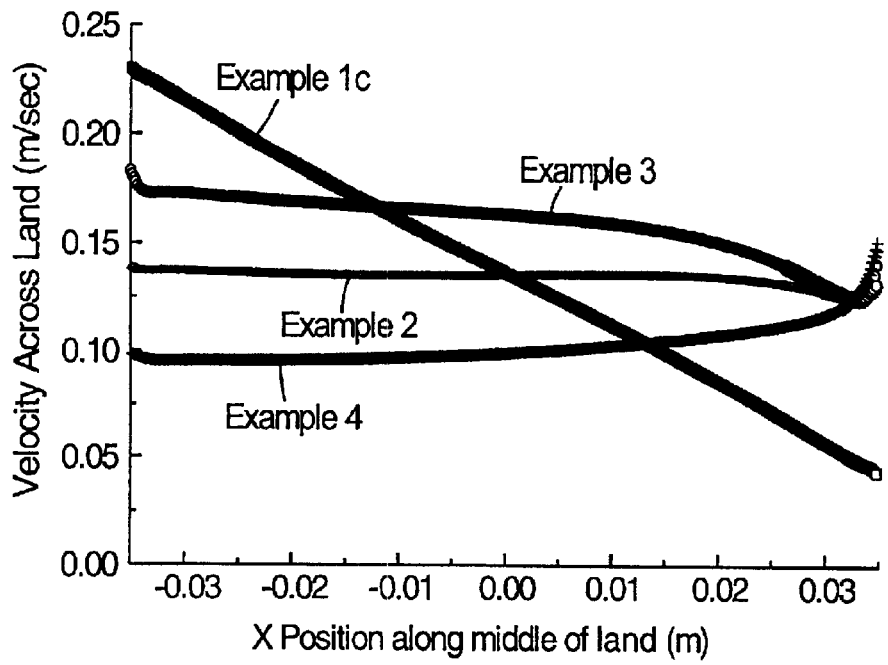
FIG. 5 is a graph of gas velocity crossing a land feature vs. lateral position along the land feature for each of Examples 2–4 and comparative Example 1.

Examples 3 and 4 were similar to Example 2 except that apex half-angles θ were changed to lower and higher values, 0.89 and 2.10 degrees respectively. The separation between sequential segments of the serpentine channels at the widest part (H) was 2.6 mm, 3.6 mm and 5.6 mm respectively for Examples 3, 2 and 4. Due to the change in apex half-angle, the flow field of Example 3 had 31 segments (30 loops) and the flow field of Example 4 had 19 segments (18 loops), and therefore the total channel length and pressure drop were larger for Example 3 and less for Example 4. It also follows that land area was less for Example 3 and greater for Example 4. FIG. 5 is a graph of gas velocity in the Y direction across a typical land feature as a function of lateral position along the land feature (i.e., in the X direction as depicted in FIGS. 1 and 3), for each of Examples 2–4 and comparative Example 1. Gas velocities in each of Examples 2–4 are more uniform than in comparative Example 1, although Example 2 appears to be more optimal than Examples 3 and 4.

The plots in FIG. 5 also show that the magnitude of the average velocities is reduced as the apex half-angle increases. As shown in more detail above, this effect can be offset by changing the value of the permeability, K, of the DCC.

Examples 5C and 6

Non-zero Consumption

Figure 7:
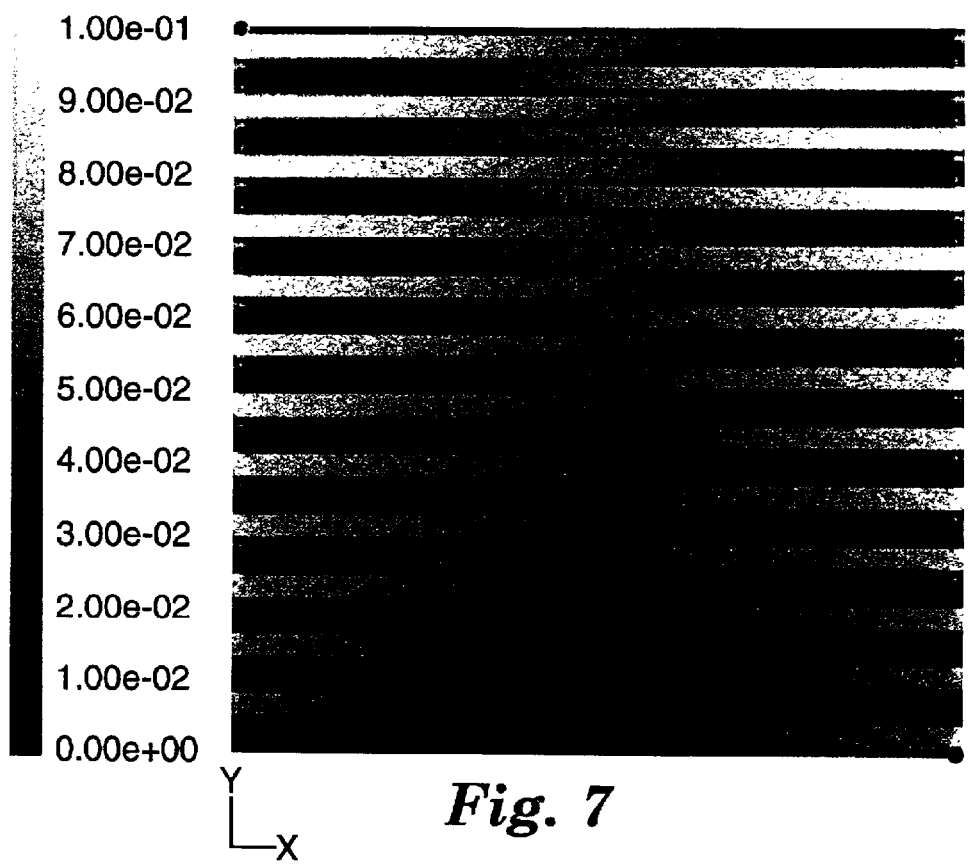
FIG. 7 depicts a CFD model of the comparative flow field of Example 5C, which is identical to the comparative flow field of Example 1C except for the addition of oxygen consumption, with calculated oxygen flux represented according to the indicated gray scale.

In Example 5C, the CFD model for the comparative flow field of Example 1C, having a single serpentine channel composed of parallel adjacent channels, was run with the modification that oxygen consumption was added to the model at a stoichiometric flow ratio, η, of 2.0. The stoichiometric flow ratio is the ratio of oxygen supplied to oxygen consumed. FIG. 7 depicts the resulting in-plane oxygen flux, which is predominantly in the Y direction.

In Example 6, the CFD model for the flow field of Example 2, having a single "zig-zag" serpentine channel, was run with the modification that oxygen consumption was added to the model at a stoichiometric flow ratio, η, of 2.0. FIG. 8 depicts the resulting in-plane oxygen flux, which is predominantly in the Y direction.

FIGS. 7 and 8 demonstrate that non-uniformities are amplified when oxygen consumption is initiated. The "zig-zag" serpentine is far superior in uniformity.

Example 7

"Progressive Zig-zag" Serpentine Flow Field

Figure 9:
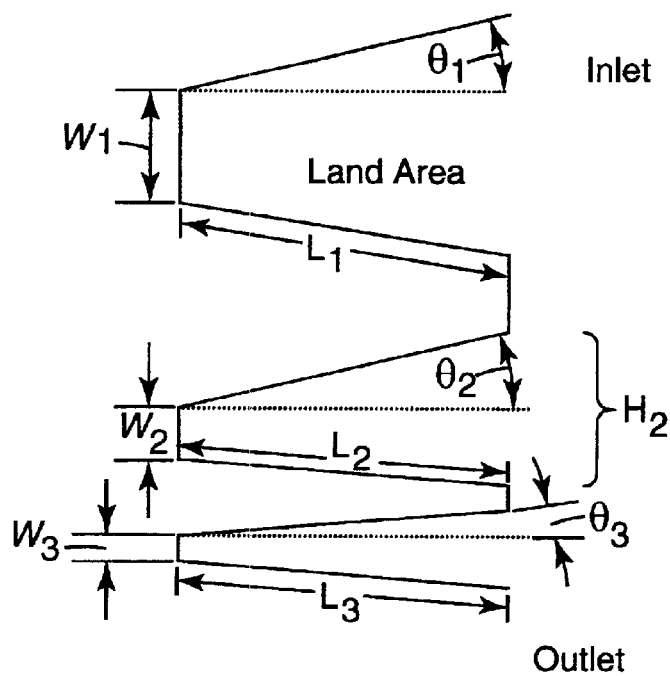
FIG. 9 is a schematic depiction of a "progressive zig-zag" serpentine flow field with varying apex half-angle, θ, according to the present invention, depicting parameters discussed in the text.
Figure 10:
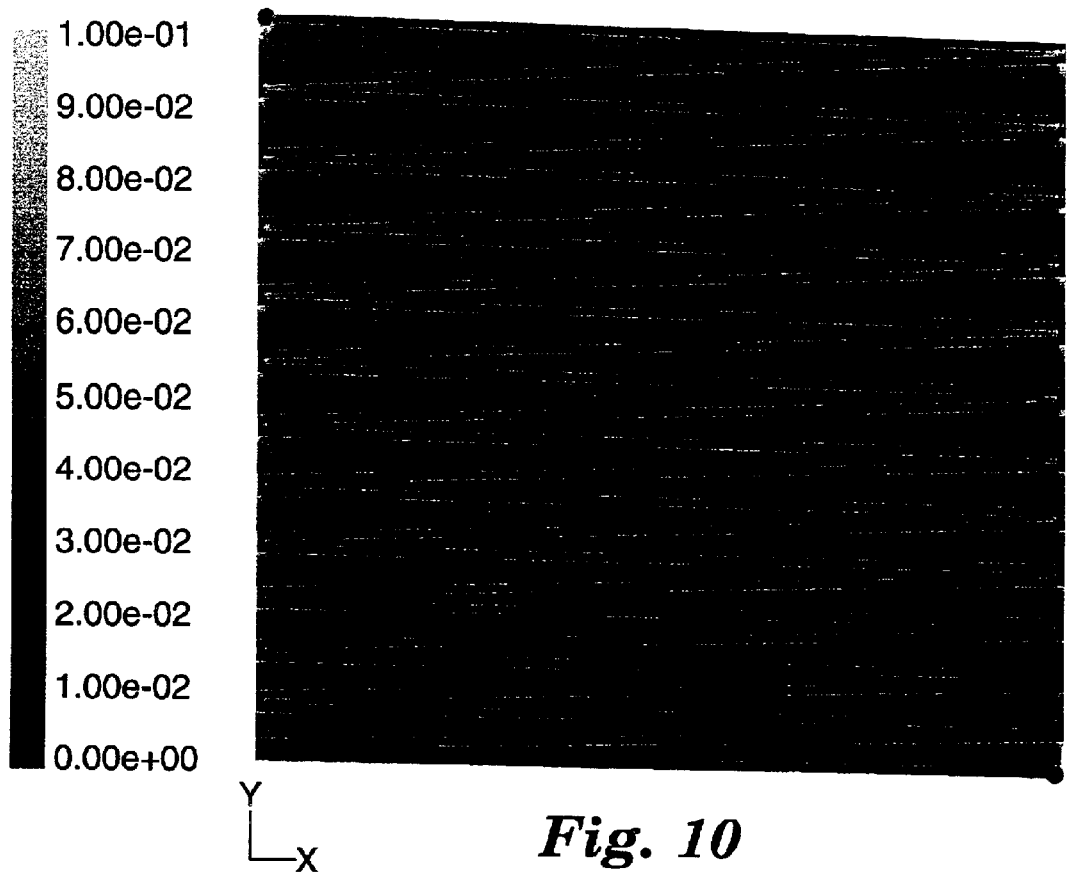
FIG. 10 depicts a CFD model, which includes oxygen consumption, of the "progressive zig-zag" serpentine flow field according to the present invention of Example 7, with calculated oxygen flux represented according to the indicated gray scale, which is the same gray scale as FIG. 7.

A CFD model was built for a flow field similar to Example 6, including oxygen consumption at a stoichiometric flow ratio (η) of 2.0, but differing in that the apex half-angle, θ, as defined in FIG. 9, is progressively narrowed from 1.75 degrees at the inlet to 0.80 degrees at the outlet. The small end of the lands is fixed at 0.4 mm while the large end varies from 4.8 mm to 2.4 mm. Note that the average large end is 3.6 mm, matching Example 2, and the number of channel segments is 25 as well, also matching Example 2. This "progressive zig-zig" flow field also comprised channel segments each 0.8 mm wide×1.0 mm deep, forming an active area of 50 $cm^2$ and the overall channel length and land area were approximately the same as in Example 2. The same DCC having a thickness of 122 microns (4.8 mils) and an in-plane permeability of $K=12\times10^{-12}$ $m^2$, and 800 sccm total air mass flow rates was used.

Figure 11:
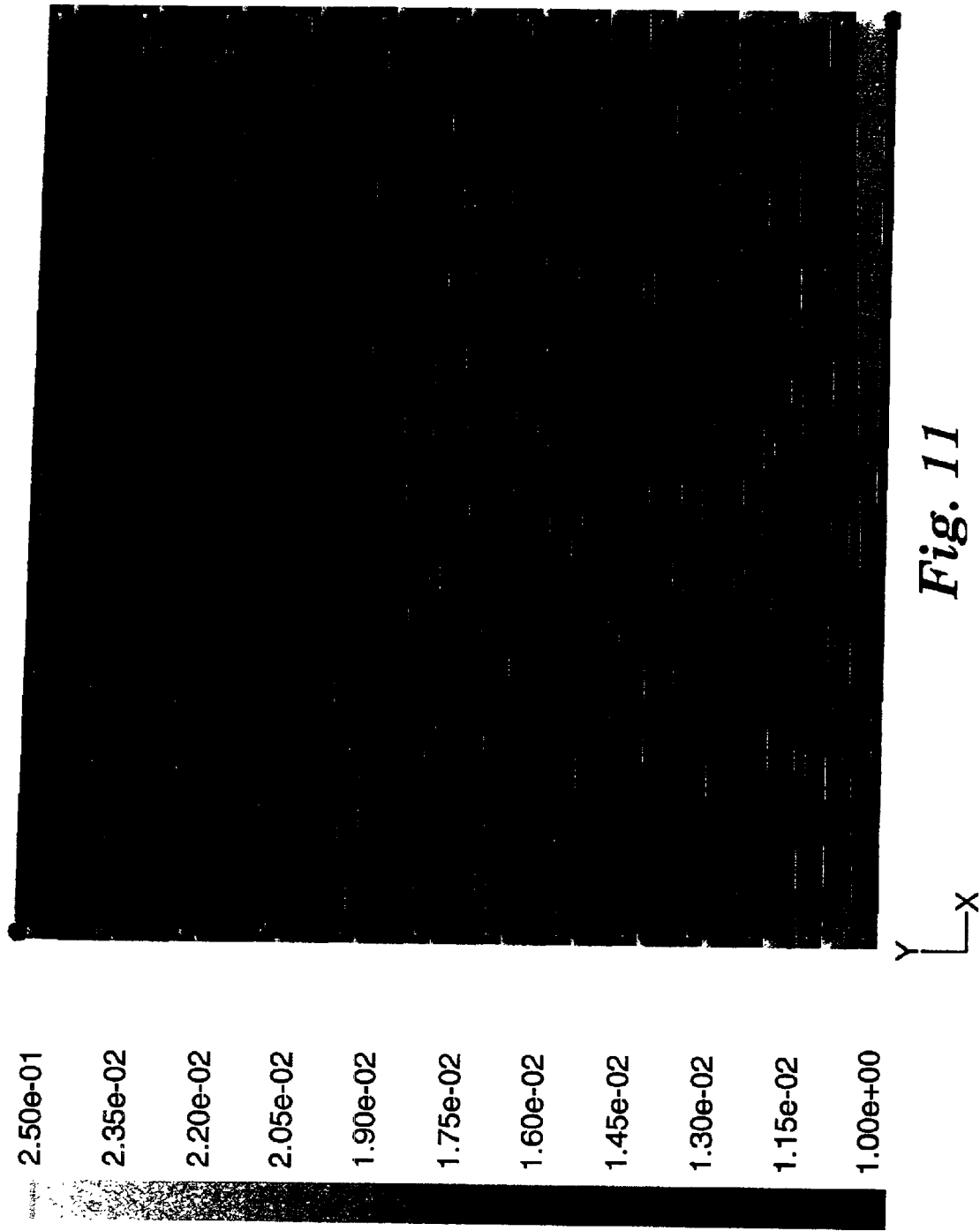
FIG. 11 depicts a CFD model, which includes oxygen consumption, of the "progressive zig-zag" serpentine flow field according to the present invention of Example 7, with calculated gas velocities represented according to the indicated gray scale.

FIGS. 10 and 11 demonstrate the in-plane oxygen flux in the Y direction and the gas velocities in the Y direction for this progressive zig-zag flow field. The progressively narrowing apex angle causes overland gas velocity on the downstream side of the flow field to increase, thereby compensating for the progressively decreasing partial pressure of oxygen caused by consumption.

Figure 12:
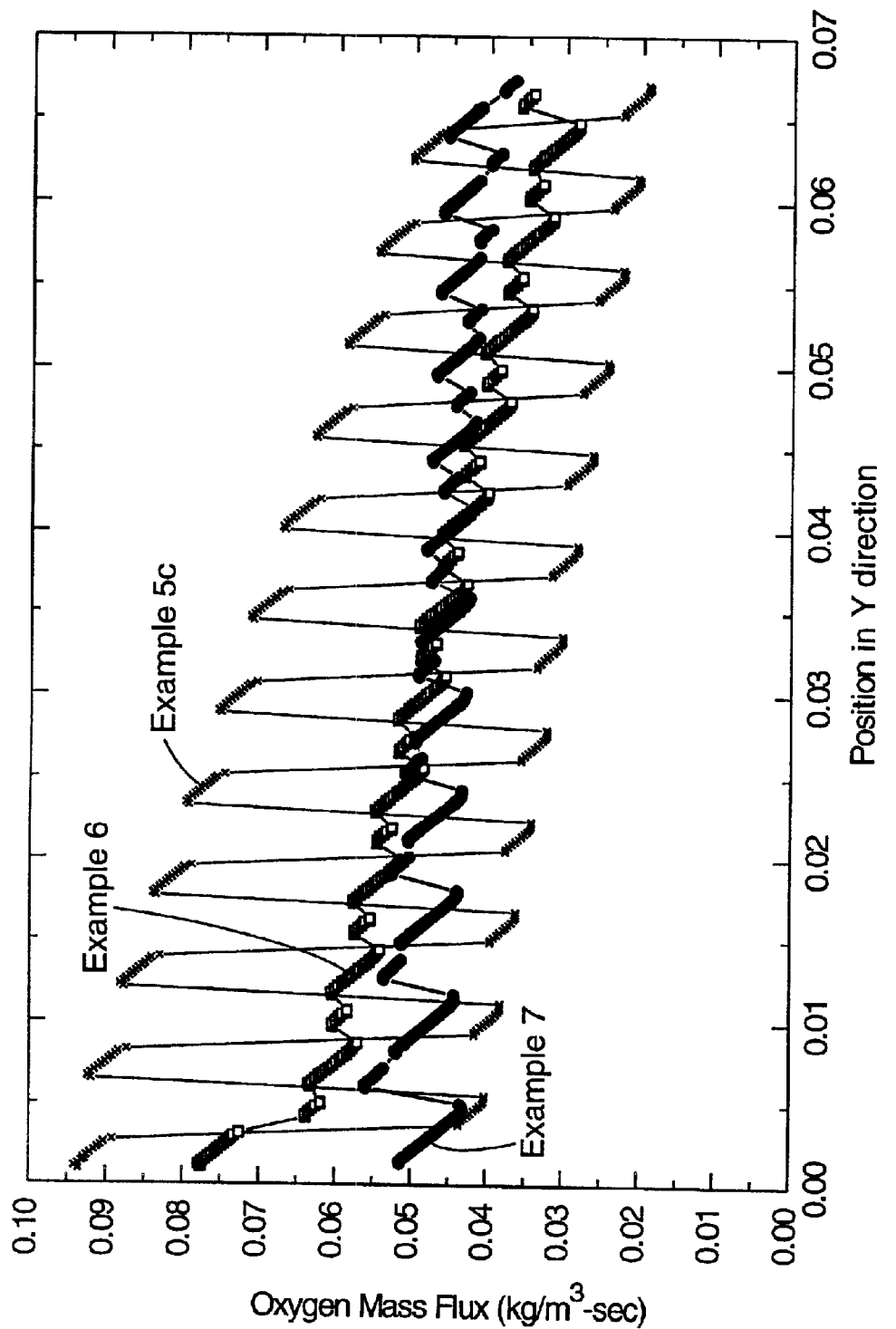
FIG. 12 is a graph of oxygen flux crossing a land feature in the Y direction vs. position in the Y direction for each of Examples 6, 7 and comparative Example 5C, taken at an X position approximately 22% of the width of the flow field from the left side of the flow field.

FIG. 12 compares the flow fields of Examples 5C, 6 and 7. It is evident that the zig-zag serpentine flow field according to the present invention demonstrates far more uniform oxygen flux than the comparative parallel-segment serpentine, and the progressive zig-zag demonstrates even better uniformity.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A fluid distribution assembly comprising: 1) a flow field device embodying a flow field which comprises an active area comprising a) at least one channel having an inlet and an outlet, and b) at least one land area, and 2) a fluid transport layer disposed between said active area and a target area;

wherein, for at least one non-zero flow rate of a fluid into said inlet and at least one use rate of an active component of the fluid in the fluid transport layer, lateral flux of said active component varies by no more than 35% through at least 90% of all overland portions of said fluid transport layer.

2. The fluid distribution assembly according to claim 1 wherein lateral flux of said active component varies by no more than 25% through at least 90% of all overland portions of said fluid transport layer.

3. The fluid distribution assembly according to claim 1 wherein 70% or more of the active area of said flow field is land area.

4. The fluid distribution assembly according to claim 3 wherein lateral flux of said active component varies by no more than 25% through at least 90% of all overland portions of said fluid transport layer.

5. The fluid distribution assembly according to claim 1 wherein said channel is a serpentine channel.

6. The fluid distribution assembly according to claim 5 wherein at least two sequential major segments of said serpentine channel are non-parallel.

7. The fluid distribution assembly according to claim 5, wherein at least three sequential major segments of said serpentine channel are non-parallel.

8. The fluid distribution assembly according to claim 5, wherein no more than 49% of the major segments of said serpentine channel are parallel.

9. The fluid distribution assembly according to claim 5, wherein no more than 25% of the major segments of said serpentine channel are parallel.

10. The fluid distribution assembly according to claim 1 wherein said channel comprises major segments separated by land areas, wherein the areal size of the land areas decreases monotonically with distance from the inlet as measured along said channel.

11. A fuel cell comprising the fluid distribution assembly according to claim 1.

12. A flow field device embodying a flow field comprising at least one serpentine channel wherein at least two sequential major segments of said serpentine channel are non-parallel.

13. The flow field device according to claim 12, wherein at least three sequential major segments of said serpentine channel are non-parallel.

14. The flow field device according to claim 12, wherein no more than 49% of the major segments of said serpentine channel are parallel.

15. The flow field device according to claim 12, wherein no more than 25% of the major segments of said serpentine channel are parallel.

16. The fluid distribution assembly according to claim 12 wherein said channel comprises major segments separated by land areas, wherein the areal size of the land areas decreases monotonically with distance from the inlet as measured along said channel.

17. The flow field device according to claim 12 wherein said channel comprises multiple courses.

18. A fluid distribution assembly comprising: i) a flow field device according to claim 12, and ii) a fluid transport layer disposed between said active area and a target area.

19. The flow field device according to claim 12 which is porous.

20. The flow field device according to claim 12 which is non-porous.

21. The flow field device according to claim 12 which is electrically conductive.

22. A flow field device embodying a flow field comprising at least one channel and at least one land area, wherein said land area separates a first major segment of said channel and a second major segment of said channel, wherein for any first point on said first major segment there is a second point on said second major segment which is nearest to said first point, and wherein the shortest distance between said first and second points increases monotonically with the distance between said first and second points measured as distance along said channel.

23. The fluid distribution assembly according to claim 22 wherein said channel is a serpentine channel.

24. The flow field device according to claim 23 wherein at least two sequential major segments of said serpentine channel form an angle of greater than 0 and less than 45 degrees.

25. The flow field device according to claim 23 wherein at least two sequential major segments of said serpentine channel form an angle of greater than 0 and less than 10 degrees.

26. The flow field device according to claim 23 wherein at least two sequential major segments of said serpentine channel form an angle of greater than 0.5 and less than 10 degrees.

27. The flow field device according to claim 23, wherein a first pair of sequential major segments of said serpentine channel form a first acute angle, wherein a second pair of sequential major segments of said serpentine channel form a second acute angle, and wherein said first acute angle is not equal to said second acute angle.

28. The flow field device according to claim 23 wherein said serpentine channel has an inlet, wherein a first pair of sequential major segments of said serpentine channel form a first acute angle, wherein a second pair of sequential major segments of said serpentine channel form a second acute angle, wherein said first pair of sequential major segments is closer to the inlet than said second pair of sequential major segments as measured in distance along said serpentine channel, and wherein said first acute angle is greater than said second acute angle.

29. The flow field device according to claim 23 wherein said serpentine channel has an inlet, wherein sequential major segments of said serpentine channel form acute angles, and wherein said acute angles decrease in distance from said inlet as measured in distance along said serpentine channel.

30. The flow field device according to claim 23 wherein said channel comprises multiple courses.

31. A fluid distribution assembly comprising: i) a flow field device according to claim 23, and ii) a fluid transport layer disposed between said active area and a target area.

32. A flow field device embodying a flow field comprising at least one channel comprising major segments which comprise analogous parts, wherein the distance between analogous parts of sequential major segments decreases monotonically with distance from the inlet as measured along said channel.

33. A flow field device embodying a flow field comprising at least one channel comprising major segments separated by land areas, wherein the areal size of the land areas decreases monotonically with distance from the inlet as measured along said channel.

* * * * *

UNITED STATES PATENT AND TRADEMARK OFFICE
CERTIFICATE OF CORRECTION

PATENT NO. : 6,780,536 B2
DATED : August 24, 2004
INVENTOR(S) : Debe, Mark K. et al.

It is certified that error appears in the above-identified patent and that said Letters Patent is hereby corrected as shown below:

Column 10,
Lines 10-17, replace the formula with the following:
--
since $\cos\theta = x_0/g$ in Fig. 2 above.

Also from Fig. 2, $y_0 = 2 \cdot x_o \tan\theta + w$. Replacing $y_0$ in (2) with this gives, from (1), $$(3) \quad U_y(x) = -\frac{K_L}{\mu} \cdot \frac{\Delta P}{N(w+2L)} \frac{\left(w + 2 x_0/\cos\theta\right)}{(w + 2 x_0 \tan\theta)}$$

--.

Column 11,
Lines 37-42, replace the formula with the following:
--
$$(5) \quad U_{i,y}(x) = -\frac{K_L}{\mu} \cdot \frac{\Delta P_i}{(w_i + 2L_i)} \frac{\left(w_i + 2 x_0/\cos\theta_i\right)}{(w_i + 2 x_0 \tan\theta_i)}, \quad \text{where } \Delta P = \sum_{i=1}^{N} \Delta P_i$$

--.

Line 67, replace the formula with the following:
--
$$\rho_i(O_2) = p_{i,O_2} \cdot M_w / RT$$ at that point of loop $i$: --.

Column 12,
Lines 1-5, replace the formula with the following:
--
$$(7) \quad \frac{dm_{i,O_2}}{dA}(x = L) = \frac{-K_L M_w}{RT\mu} \frac{p_{i,O_2} \Delta P_i}{2L_i \sin\theta_i},$$
--.

Line 8, replace the formula with the following:

-- $\Delta P_i$ and $p_{i,O_2}$ --.

Line 20, replace the formula with the following:

-- For $p_{i,O_2}$ --.

UNITED STATES PATENT AND TRADEMARK OFFICE
CERTIFICATE OF CORRECTION

PATENT NO. : 6,780,536 B2
DATED : August 24, 2004
INVENTOR(S) : Debe, Mark K. et al.

It is certified that error appears in the above-identified patent and that said Letters Patent is hereby corrected as shown below:

Column 12 (cont'd),
Lines 30-32, replace the formula with the following:

$$-- \quad (9) \quad p_{i,O_2} = P_{in}(O_2)\left(1 - \frac{i}{N\eta}\right) \quad --.$$

Column 15,
Line 21, delete "zig-zig" and insert in place thereof -- zig-zag --.

Signed and Sealed this

Twenty-third Day of August, 2005

JON W. DUDAS
*Director of the United States Patent and Trademark Office*